United States Patent
Feng (10) Patent No.: US 11,733,562 B2
(45) Date of Patent: Aug. 22, 2023

(54) BACKLIGHT MODULE COMPRISING A DIFFRACTIVE OPTICAL ELEMENT CONFIGURED TO SHAPE A COLLIMATED ELLIPTICAL SPOT INTO A RECTANGULAR SPOT WITH A LARGER AREA

(71) Applicant: HEFEI UNIVERSITY OF TECHNOLOGY, Anhui (CN)

(72) Inventor: Qibin Feng, Anhui (CN)

(*) Notice: Subject to any disclaimer, the term of this patent is extended or adjusted under 35 U.S.C. 154(b) by 0 days.

(21) Appl. No.: 17/271,923

(22) PCT Filed: Nov. 13, 2019

(86) PCT No.: PCT/CN2019/117843
§ 371 (c)(1),
(2) Date: Feb. 26, 2021

(87) PCT Pub. No.: WO2020/207012
PCT Pub. Date: Oct. 15, 2020

(65) Prior Publication Data
US 2022/0026766 A1    Jan. 27, 2022

(30) Foreign Application Priority Data

Apr. 11, 2019   (CN) .......................... 201910289586.0
Jun. 19, 2019   (CN) .......................... 201910530814.9

(51) Int. Cl.
*G02F 1/13357*   (2006.01)

(52) U.S. Cl.
CPC .. *G02F 1/133606* (2013.01); *G02F 1/133608* (2013.01); *G02F 1/133621* (2013.01)

(58) Field of Classification Search
CPC .. G02B 5/0252; G02B 5/1819; G02B 27/425; G02B 30/33; G02F 2201/305
See application file for complete search history.

(56) References Cited

U.S. PATENT DOCUMENTS

| | | | |
|---|---|---|---|
| 2013/0016410 A1 | 1/2013 | Futterer | |
| 2015/0309235 A1* | 10/2015 | Kawaguchi | G02B 6/02 362/510 |
| 2018/0081166 A1* | 3/2018 | Naftail | G02B 21/002 |
| 2018/0321566 A1* | 11/2018 | Geerlings | B23K 26/0869 |
| 2020/0200954 A1* | 6/2020 | Mossberg | G02B 5/1819 |

FOREIGN PATENT DOCUMENTS

| | | | |
|---|---|---|---|
| CN | 2769942 Y | | 4/2006 |
| CN | 102287714 A | * | 12/2011 |
| CN | 108224240 A | | 6/2018 |
| CN | 108303824 A | | 7/2018 |
| CN | 110262129 A | | 9/2019 |

* cited by examiner

*Primary Examiner* — Paul C Lee
(74) *Attorney, Agent, or Firm* — Global IP Services; Tianhua Hu (57) ABSTRACT

The present disclosure provides a backlight module, a liquid crystal display, and an electronic device. The backlight module includes: a backplane; at least one light source arranged on the backplane; and at least one diffractive optical element arranged above the light source, and a central axis of the diffractive optical element and a central axis of the light source are on a same straight line.

17 Claims, 10 Drawing Sheets

BACKLIGHT MODULE COMPRISING A DIFFRACTIVE OPTICAL ELEMENT CONFIGURED TO SHAPE A COLLIMATED ELLIPTICAL SPOT INTO A RECTANGULAR SPOT WITH A LARGER AREA

CROSS REFERENCE TO RELATED APPLICATION

This is a Sect. 371 National Stage of PCT International Application No. PCT/CN2019/117843, filed on 13 Nov. 2019, which claims priority of a Chinese Patent Application No. CN2019102895860 filed on 11 Apr. 2019 and a Chinese Patent Application No. CN2019105308149 filed on 19 Jun. 2019, the contents of which are incorporated herein by reference in its entirety for all purposes.

BACKGROUND

Field of Disclosure

The present disclosure relates to the technical field of liquid crystal display (LCD), in particular to a backlight module, an LCD, and an electronic device.

Description of Related Arts

LCD has become the mainstream technology of flat panel display. The liquid crystal itself does not emit light, it needs a backlight module to provide light to illuminate the display area. The brightness, uniformity, and color gamut of the backlight module have a great influence on the optical performance of the terminal display.

At present, the backlight assemblies of LCDs on the market generally use light emitting diodes (LEDs) as the backlight source. Because the LED spectrum is continuous, the three primary colors of Red (R), Green (G), and Blue (B) are produced by the RGB filters in the liquid crystal display panel, the three primary colors have low saturation and limited color gamut. In order to expand the color gamut and enrich people's visual experience, laser diodes are introduced into LCDs as a new type of backlight source due to their good monochromaticity and high color saturation.

Since the spot emitted by the laser diode is a small Gaussian spot, in order to form a surface light source with uniform brightness, the spot emitted by the laser diode is usually shaped and enlarged by scanning or a light guide plate or a system composed of multiple optical lenses, resulting in the structure of the backlight module is complex and bulky.

SUMMARY

The present disclosure provides a backlight module, an LCD, and an electronic device. The backlight module has a compact structure, a light volume, and a high color saturation.

The present disclosure provides a backlight module, which includes: a backplane; at least one light source arranged on the backplane; and at least one diffractive optical element arranged above the light source, and a central axis of the diffractive optical element and a central axis of the light source are on a same straight line.

Further, the light source includes a laser diode, the laser diode includes a wavelength or a plurality of different wavelengths, a size of a spot emitted by the laser diode is smaller than a size of the diffractive optical element.

Further, the diffractive optical element is configured to collimate a light emitted by the laser diode, and to shape a collimated elliptical spot into a rectangular spot with a larger area.

Further, the diffractive optical element includes a diffractive surface, a phase distribution matrix of the diffractive surface includes a first phase distribution matrix and a second phase distribution matrix, and the first phase distribution matrix and the second phase distribution matrix are superimposed to form the phase distribution matrix of the diffractive optical element.

Further, the first phase distribution matrix of the diffractive surface of the diffractive optical element is configured to collimate a light emitted by the laser diode.

Further, when the backlight module includes a laser diode with a single wavelength, the second phase distribution matrix shapes and enlarges a light emitted by the laser diode to a size of the backlight module.

Further, when the backlight module comprises M×N laser diodes with a same wavelength, phase distribution matrices of a diffractive surface of the diffractive optical element are the same, a single diffractive optical element shapes and enlarges a light emitted by a single laser diode to 1/(M×N) of the size of the backlight module.

Further, when the backlight module includes M×N groups of lighting units, the lighting units include a plurality of laser diodes with different wavelengths, phase distribution matrices of the diffractive optical elements of the laser diodes corresponding to different wavelengths are different, a single diffractive optical element in each group of the lighting units shapes and enlarges a light emitted by a single laser diode to 1/(M×N) of the size of the backlight module.

Further, the backlight module further includes at least one grating element, the grating element is arranged above the diffractive optical element, and the grating element includes a first phase distribution and a second phase distribution.

Further, central axes of the light source, the diffractive optical element, and the grating element are on a same straight line, and the grating element is configured to enlarge a spot emitted by the diffractive optical element.

Further, numbers of the light source, the diffractive optical element, and the grating element are equal.

Further, after a rectangular spot passes through the first phase distribution of the grating element, the first phase distribution of the grating element enlarges a size of the rectangular spot to $2 \times W_{DOE-max} \times L_{DO-max}$, and $W_{DOE-max} \times L_{DOE-max}$ represents a maximum spot size output by the diffractive optical element.

Further, after a spot output by the first phase distribution of the grating element passes through the second phase distribution of the grating element, a size of the spot output by the second phase distribution of the grating element is $2 \times W_{DOE-max} \times 2 \times L_{DOE-max}$.

Further, a diffraction angle of the first phase distribution of the grating element is as follows:

$$\gamma = \arctan \frac{W_{DOE-output}}{2 \times d_{DOE-BLU}},$$

$W_{DOE-output}$ represents a long axis of a rectangular spot output by a single diffractive optical element, and $d_{DOE-BLU}$ represents a distance from the diffractive optical element to an output surface light source.

Further, a diffraction angle of the second phase distribution of the grating element is as follows:

$$\varphi = \arctan\frac{L_{DOE\text{-}output}}{2\times d_{DOE\text{-}BLU}},$$

$L_{DOE\text{-}output}$ represents a short axis of a rectangular spot output by a single diffractive optical element.

Further, when the light source includes a laser diode, the grating element enlarges a rectangular spot emitted by the diffractive optical element to a size of the backlight module.

Further, when the backlight module includes M×N laser diodes with a same wavelength, a single diffractive optical element shapes and enlarges a light emitted by a single laser diode to 1/(4×M×N) of the size of the backlight module, and a single grating element enlarges a single rectangular spot to 1/(M×N) of the size of the backlight module.

Further, when the backlight module includes M×N groups of lighting units, a single diffractive optical element in each group of the lighting units shapes and enlarges a light emitted by a single laser diode to 1/(4×M×N) of the size of the backlight module, and a single grating element enlarges a single rectangular spot to 1/(M×N) of the size of the backlight module.

This application proposes a liquid crystal display, which includes: a liquid crystal panel; and a backlight module arranged on a side of the liquid crystal panel. The backlight module includes: a backplane, at least one light source arranged on the backplane, and at least one diffractive optical element arranged above the light source, and a central axis of the light source and a central axis of the diffractive optical element are on a same straight line.

The present disclosure further provides an electronic device, which includes: a liquid crystal panel; and a backlight module arranged on a side of the liquid crystal panel. The backlight module includes: a backplane, at least one light source arranged on the backplane, and at least one diffractive optical element arranged above the light source, and a central axis of the light source and a central axis of the diffractive optical element are on a same straight line.

The present disclosure proposes a backlight module, an LCD, and an electronic device. The light emitted by the light source is expanded and homogenized through a diffractive optical element, which can form a surface light source with uniform brightness and a large area in a small volume, which effectively reduces the number of light sources, reduces the volume of the backlight module, improves the heat dissipation effect of the backlight module, and saves costs.

DETAILED DESCRIPTION OF THE PREFERRED EMBODIMENTS

The embodiments of the present disclosure will be described below. Those skilled can easily understand other advantages and effects of the present disclosure according to contents disclosed by the specification. The present disclosure can also be implemented or applied through other different specific embodiments. Various modifications or changes can also be made to all details in the specification based on different points of view and applications without departing from the spirit of the present disclosure.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated.

Figure 1A:
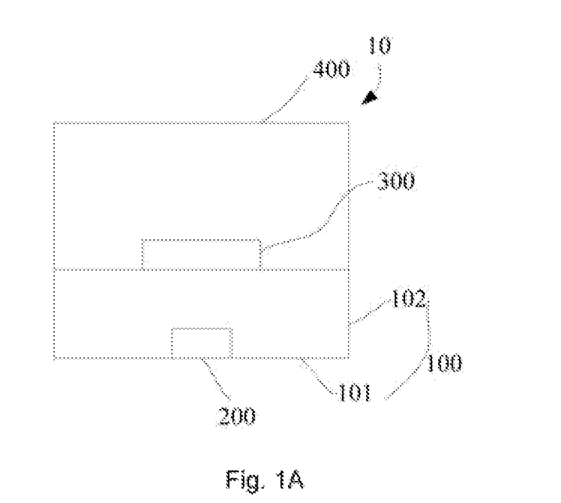
FIG. 1A shows a backlight module according to an embodiment of the present disclosure.

Referring to FIG. 1A, this embodiment proposes a backlight module 10, which includes a backplane 100, at least one light source 200, and at least one diffractive optical element 300.

Referring to FIG. 1A, the backplane 100 includes a substrate 101 and a plurality of backplane frames 102. The substrate 101 and the backplane frame 102 may be separately molded, and a material of the substrate 101 and the backplane frame 102 may be, for example, metal or plastic. The substrate 101 and the backplane frame 102 are vertically fixed. In this embodiment, the substrate 101 and the backplane frame 102 may be fixed by screws, clamping, welding and other methods. In other embodiments, a layer of heat dissipation paint may be applied to an outer surface of the backplane 100, and the heat dissipation paint applied on the outer surface of the backplane 100 improves the heat dissipation efficiency of the surface of the backplane 100. The heat dissipation paint may be, for example, boron nitride ceramic paint, aluminum nitride ceramic paint or alumina ceramic paint. Since the heat dissipation paint is coated on the outer surface of the backplane 100, the backlight light source can directly dissipate heat through the backplane 100, so there is no need to use a heat sink, thereby reducing the cost and simplifying the assembly process of the backlight module 10.

Referring to FIG. 1A, in this embodiment, the backlight module 10 includes a light source 200, the light source 200 is arranged on the substrate 101. The substrate 101 includes a printed circuit board (not shown in the figure), the light source 200 is packaged on the printed circuit board of the backplane 100. The light source 200 serves as a backlight light source, and the light source 200 is used to emit light (elliptical spot). A horizontal divergence angle of the light emitted by the light source 200 ranges from 20° to 30°, such as 23°, or 25°, and a vertical divergence angle of the light ranges from 10° to 20°, such as 10°, or 18°. In other embodiments, the light source 200 is arranged on a base, the base is mounted on the substrate 101, and the base is connected with a circuit board on the substrate 101.

Figure 1B:
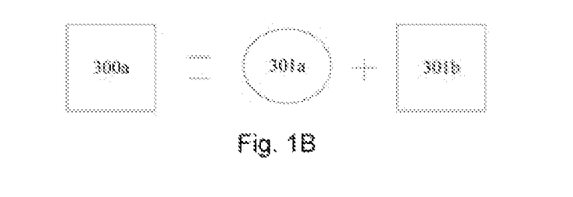
FIG. 1B shows a schematic view of the superposition of the phase distribution of a diffractive optical element.

Referring to FIGS. 1A-1B, in this embodiment, the backlight module 10 includes a diffractive optical element 300. The diffractive optical element 300 is arranged on the backplane 100, the diffractive optical element 300 is located above the light source 200. A center line of the diffractive optical element 300 and a center line of the light source 200 are on the same straight line. The diffractive optical element 300 collimates the light emitted by the light source 200 (such as an elliptical spot), and shapes the collimated elliptical spot into a rectangle spot with a larger area, which improves the output efficiency. In this embodiment, the diffractive optical element 300 may include a diffractive surface 301 (not shown in the figure), and a phase distribution matrix of the diffractive surface 301 includes a first phase distribution matrix 301a and a second phase distribution matrix 301b. The first phase distribution matrix 301a and the second phase distribution matrix 301b form a phase distribution matrix 300a of the diffractive optical element 300 through periodic superposition. The first phase distribution matrix 301a collimates the light emitted by the light source 200, and the second phase distribution matrix 301b shapes the collimated spot of the first phase distribution matrix 301a. In this embodiment, the first phase distribution matrix 301a and the second phase distribution matrix 301b may be designed through the Geschberg-Sachston algorithm. The phase distribution matrix 300a of the diffractive optical element 300 is formed by periodically superimposing the first phase distribution matrix 301a and the second phase distribution matrix 301b.

In this embodiment, the diffractive surface 301 includes surface microstructures to realize the spot collimation function and the spot shaping and magnifying function. The resolution of the surface microstructure (not shown in the figure) is the same as the number of rows and columns of the phase distribution matrix of the diffractive surface of the diffractive optical element. The height of the surface microstructure is determined by the phase after the superimposition of the first phase distribution and the second phase distribution of the diffractive surface of the diffractive optical element.

Referring to FIG. 1A, in this embodiment, the backlight module 10 includes a light source 200 and a diffractive optical element 300. The first phase distribution matrix 301a of the diffractive surface of the diffractive optical element 300 collimates the light (elliptical spot) emitted by the light source 200, then the second phase distribution matrix of the diffractive surface of the diffractive optical element 300 shapes and enlarges the collimated elliptical spot to form a rectangular spot, and the rectangular spot meets the size of the backlight module 10.

Figure 2A:
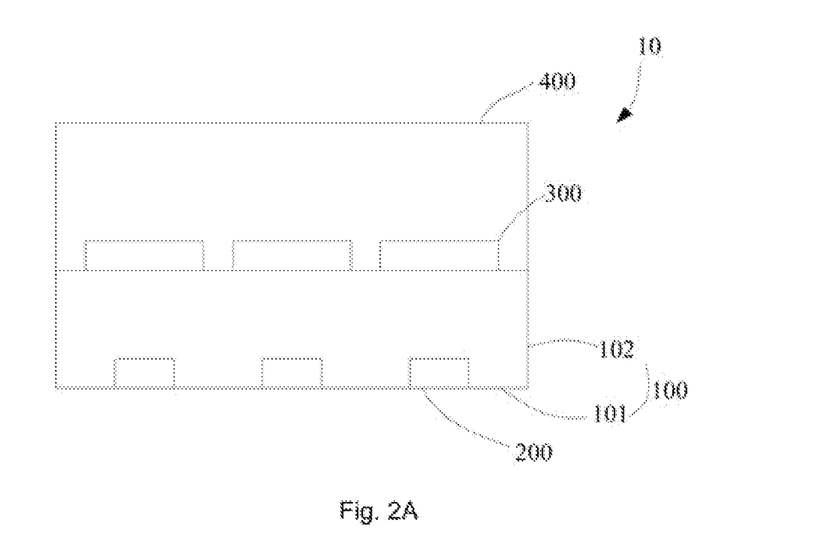
FIG. 2A shows a backlight module according to an embodiment of the present disclosure.

Referring to FIG. 2A, this embodiment proposes a backlight module 10, which includes a backplane 100, at least one light source 200, and at least one diffractive optical element 300.

Figure 2B:
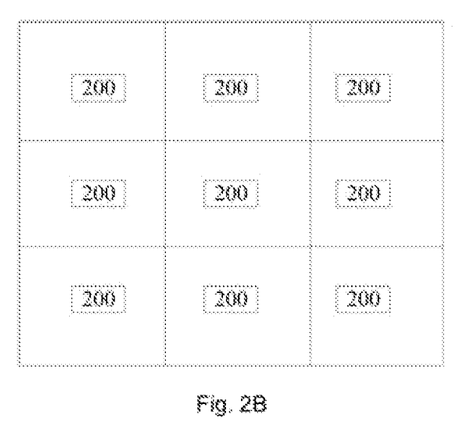
FIG. 2B shows a layout view of a light source according to an embodiment of the present disclosure.

Referring to FIGS. 2A-2B, in this embodiment, the backlight module 10 includes a plurality of light sources 200 (for example, nine light sources). The light sources 200 are arranged on the substrate 101. In this embodiment, the light source 200 is a monochromatic laser diode. In this embodiment, the nine light sources 200 are fixed on the substrate 101 in a 3×3 array, and two adjacent light sources 200 are spaced by an interval from each other. In other embodiments, the nine light sources 200 may be fixed on the substrate 101 in other ways.

Figure 2C:
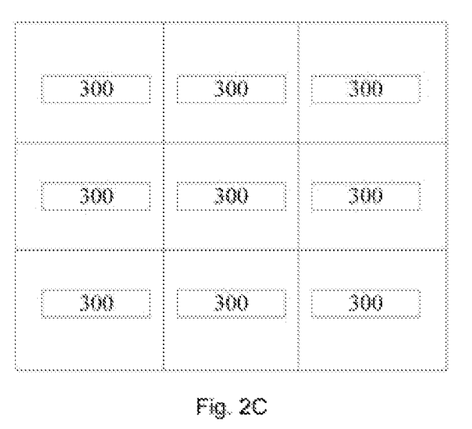
FIG. 2C shows a layout view of the diffractive optical element according to an embodiment of the present disclosure.
Figure 2D:
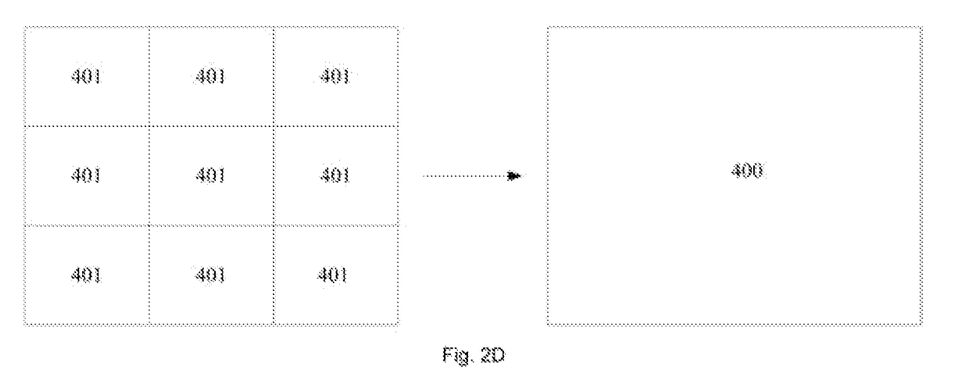
FIG. 2D shows a rectangular spot and a combined monochromatic surface light source formed by a single diffractive optical element.

Referring to FIGS. 2A and 2C, in this embodiment, the backlight module 10 includes a plurality of diffractive optical elements 300 (for example, nine diffractive optical elements). The diffractive optical elements 300 are arranged on the backplane 100, the diffractive optical elements 300 are aligned to and arranged above the light sources 200. The center lines of the diffractive optical element 300 and the light source 200 are on the same straight line. The diffractive optical element 300 collimates the light (elliptical spot) emitted by the light source 200 and shapes the collimated elliptical spot into a rectangular spot, and the rectangular spot formed by the diffractive optical element 300 has a size of about a few centimeters, for example, 5-8 centimeters. In this embodiment, the wavelengths of the nine light sources 200 are the same, and the diffractive surfaces 301 of the nine diffractive optical elements 300 are the same, that is, the phase distribution matrices 300a of the nine diffractive optical elements 300 are the same.

Referring to FIGS. 2A-2C, in this embodiment, the backlight module 10 includes nine diffractive optical elements 300, two adjacent diffractive optical elements 300 are spaced by an interval from each other. The nine diffractive optical elements 300 are correspondingly arranged above the nine light sources 200. In this embodiment, the light (elliptical spot) emitted by a single light source 200 is collimated by the first phase distribution matrix 301a of the single diffractive optical element 300, then the second phase distribution matrix 301b of the diffractive optical element 300 shapes the collimated elliptical spot into a rectangular spot with a larger area. In this embodiment, the backlight module 10 includes nine light sources 200, and the diffractive optical element 300 forms, for example, nine rectangular spots 401. The nine matrix spots have the same size, the size of the single matrix spot 401 is equal to ⅑ of the size of the backlight module 10. The nine matrix spots are mixed and superimposed to form a surface light source 400 with a larger area. The size of the surface light source is equal to the size of the backlight module 10.

It should be noted that in some embodiments, the light source and the diffractive optical element may have other numbers, such as 4, 16 or other numbers, which is not limited to nine.

Figure 5:
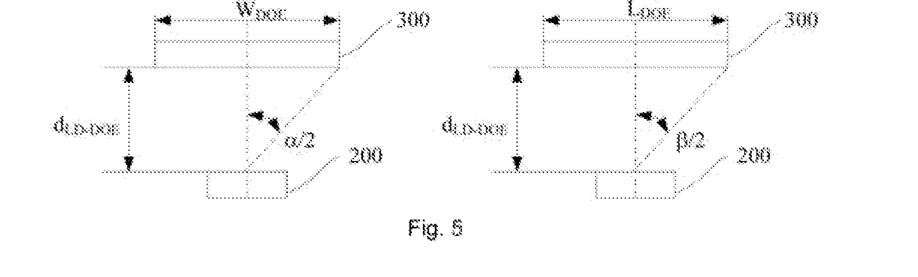
FIG. 5 shows a schematic view of horizontal and vertical divergence angles of a laser diode.

Referring to FIGS. 2A, 2C, and 5, in this embodiment, the incident area of light collimated by a single diffractive optical element 300 is an elliptical spot with a long axis $W_{DOE}$ and a short axis $L_{DOE}$.

$$W_{DOE} = 2\tan\frac{\alpha}{2} \times d_{LD\text{-}DOE}, L_{DOE} = 2\tan\frac{\beta}{2} \times d_{LD\text{-}DOE}$$

$W_{DOE}$ represents the major axis of the elliptical spot area collimated by the diffractive optical element (DOE), $L_{DOE}$ represents the short axis of the elliptical spot area collimated by the diffractive optical element, α represents a horizontal divergence angle of the laser diode (LD), β represents a vertical divergence angle of the laser diode, and $d_{LD\text{-}DOE}$ represents a distance from the light source 200 to the diffractive optical element 300.

Figure 6:
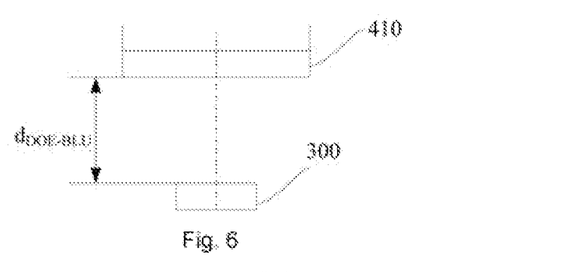
FIG. 6 shows a schematic view of a distance from the diffractive optical element to a spot.

Referring to FIGS. 2A, 2C, and 6, in this embodiment, the maximum area of the rectangular spot after being shaped by the diffractive optical element 300 is $W_{DOE\text{-}max} \times L_{DOE\text{-}max}$.

$$W_{DOE\text{-}max} = \frac{\lambda \times d_{DOE\text{-}BLU}}{\text{Pixel}_{DOE\text{-}x}}, L_{DOE\text{-}max} = \frac{\lambda \times d_{DOE\text{-}BLU}}{\text{Pixel}_{DOE\text{-}y}}$$

$W_{DOE\text{-}max}$ represents the long axis of the rectangular spot shaped by the diffractive optical element, $L_{DOE\text{-}max}$ represents the short axis of the rectangular spot shaped by the diffractive optical element, λ represents a wavelength of the light emitted by the laser diode, $\text{Pixel}_{DOE\text{-}x}$ represents an interval of the diffractive optical elements in an X direction, $\text{Pixel}_{DOE\text{-}y}$ represents an interval of the diffractive optical elements in a Y direction, the X direction is perpendicular to the Y direction, and $d_{DOE\text{-}BLU}$ represents a distance between the diffractive optical element 300 and the output surface light source 400.

In this embodiment, it is assumed that a size of an illumination spot of the backlight module 10 is $W_{BLU} \times L_{BLU}$. The minimum number of laser diodes and diffractive optical elements required by the backlight module can be calculated according to the maximum size of the spot shaped and output by the diffractive optical element 300. It is assumed that the number of diffractive optical elements is $M_{DOE} \times N_{DOE}$, $M_{DOE} = W_{BLU}/W_{DOE\text{-}max}+1$, $N_{DOE} = L_{BLU}/L_{DOE\text{-}max}+1$, $W_{BLU}$ represents a long axis of a spot output surface, $L_{BLU}$ represents a short axis of the spot output surface. In this embodiment, the number of the diffractive optical elements is equal to the number of the laser diodes.

In this embodiment, an area of the rectangular spot shaped and output by a single diffractive optical element 300 can be calculated at the same time, which is denoted as $W_{DOE\text{-}output} \times L_{DOE\text{-}output}$, where $W_{DOE\text{-}output} = W_{BLU}/M_{DOE}$, $L_{DOE\text{-}output} = L_{BLU}/N_{DOE}$. $W_{DOE\text{-}output}$ represents a long axis of the area of the rectangular spot, $L_{DOE\text{-}output}$ represents a short axis of the area of rectangular spot.

Referring to FIGS. 2A-2C, in this embodiment, a spot emitted by a single light source 200 passes through a diffractive optical element 300 to form a rectangular spot with uniform brightness, the rectangular spots output by multiple diffractive optical elements 300 are mixed and superimposed to form a surface light source. The surface light source can meet the lighting requirements of the backlight module 10. In this embodiment, the size of the diffractive optical element 300 is larger than the size of the light emitted by the light source 200, and the rectangular spot formed by the diffractive optical element 300 is larger than the spot emitted by the light source 200. In this embodiment, the backlight module 10 is a monochrome backlight module.

Figure 3A:
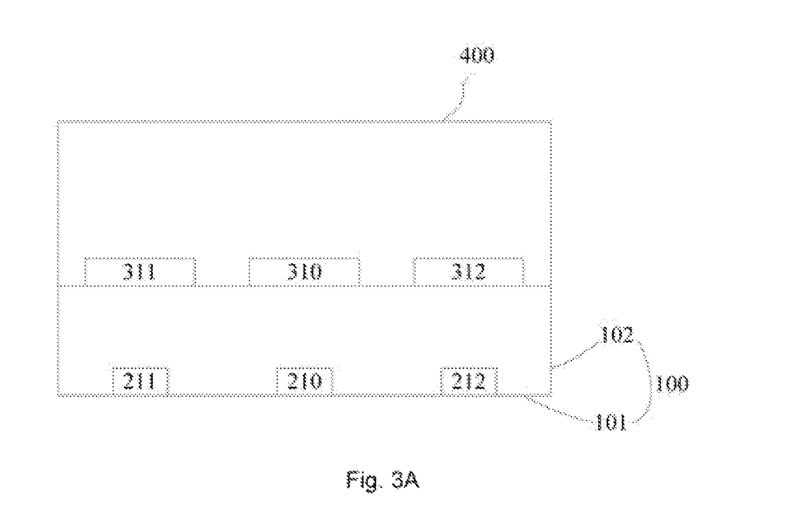
FIG. 3A shows a backlight module according to an embodiment of the present disclosure.

Referring to FIG. 3A, this embodiment proposes a backlight module 10, which includes a backplane 100, at least one light source 200, and at least one diffractive optical element 300.

Figure 3B:
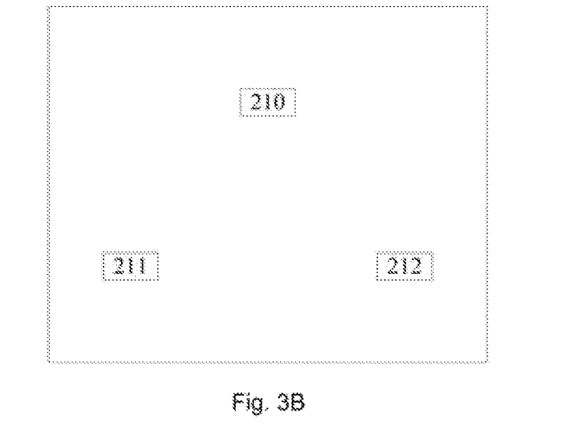
FIG. 3B shows a layout view of a light source according to an embodiment of the present disclosure.

Referring to FIGS. 3A-3B, in this embodiment, the backlight module 10 includes three light sources 200. For example, the light sources 200 may be laser diodes of different colors. In this embodiment, the three light sources 200 include a red laser diode 210, a blue laser diode 211, and a green laser diode 212. The red laser diode 210, the blue laser diode 211, and the green laser diode 212 can be mounted on the substrate 101 as shown in FIG. 3B. The red laser diode 210 is used to emit red light, and a wavelength of light emitted by the red laser diode 210 is 635 nanometers. The blue laser diode 211 is used to emit blue light, a wavelength of light emitted by the blue laser diode 211 is 470 nanometers. The green laser diode 212 is used to emit green light, and a wavelength of light emitted by the green laser diode 212 is 535 nanometers. In other embodiments, the light source 200 may also include yellow or laser diodes with other colors. In other embodiments, the light source 200 may be mounted on the substrate 101 in other ways.

Figure 3C:
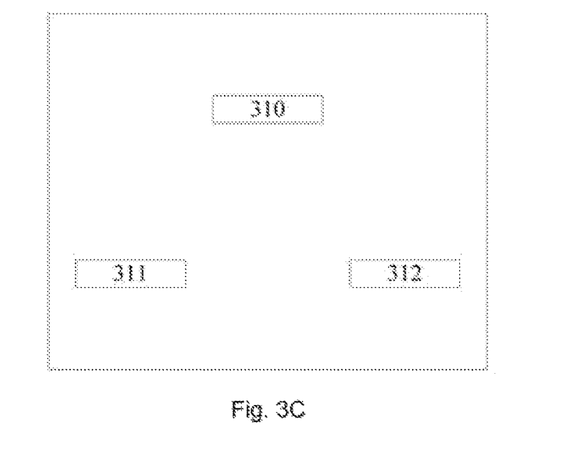
FIG. 3C shows a layout view of the diffractive optical element according to an embodiment of the present disclosure.
Figure 3D:
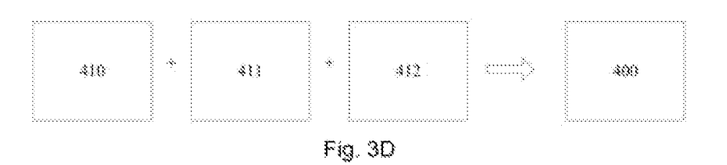
FIG. 3D shows a rectangular spot and a combined white surface light source formed by a single diffractive optical element.

Referring to FIGS. 3A, 3C, and 3D, in this embodiment, the backlight module 10 includes, for example, three diffractive optical elements 300. The diffractive optical elements 300 are arranged on the backplane, and the diffractive optical elements 300 are located above the light sources 200. The center lines of the light source 200 and the diffractive optical element 300 are located on the same straight line. The diffractive optical element 300 collimates the light emitted by the light source 200 and shapes the collimated elliptical spot into a rectangular spot with a larger area. In this embodiment, the diffractive optical element 300 includes a diffractive optical element 310, a diffractive optical element 311, and a diffractive optical element 312. The diffractive optical element 310 is aligned and arranged above the red laser diode 210, the diffractive optical element 311 is aligned and arranged above the blue laser diode 211, and the diffractive optical element 312 is aligned and arranged above the green laser diode 212. Since the red laser diode 210, the blue laser diode 211, and the green laser diode 212 emit lights with different wavelengths, the structures of the diffractive optical element 310, the diffractive optical element 311, and the diffractive optical element 312 are different. That is, the diffractive surface of the diffractive optical element 310, the diffractive surface of the diffractive optical element 311, and the diffractive surface of the diffractive optical element 312 are different. In other words, the phase distribution matrix of the diffractive optical element 310, the phase distribution matrix of the diffractive optical element 311, and the phase distribution matrix of the diffractive optical element 312 are different.

Referring to FIGS. 3A, 3C, 3D, in this embodiment, the first phase distribution matrix of the diffractive surface of the diffractive optical element 310 collimates the light (elliptical red spot) emitted by the red laser diode 210, and the second phase distribution matrix of the diffractive surface of the diffractive optical element 310 expands the collimated elliptical red spot to form a red rectangular spot 410 with a larger area. The first phase distribution matrix of the diffractive surface of the diffractive optical element 311 collimates the light (elliptical blue spot) emitted by the blue laser diode 211. The second phase distribution matrix of the diffractive surface of the diffractive optical element 311 expands the collimated elliptical blue spot to form a blue rectangular spot 411 with a larger area. The first phase distribution matrix of the diffractive surface of the diffractive optical element 312 collimates the light (elliptical green spot) emitted by the green laser diode 212. The second phase distribution matrix of the diffractive surface of the diffractive optical element 312 expands the collimated elliptical green spot to form a green rectangular spot 412 with a larger area. In this embodiment, the red rectangular spot 410, the blue rectangular spot 411, and the green rectangular spot 412 have the same size. The sizes of the red rectangular spot 410, the blue rectangular spot 411, and the green rectangular spot 412 are equal to the size of the backlight module 10. The red rectangular spot 410, the blue rectangular spot 411, and the green rectangular spot 412 are mixed to form a white surface light source 400. The white surface light source 400 meets the size of the backlight module 10, that is, the white surface light source 400 meets the lighting requirements of the backlight module 10.

Figure 3E:
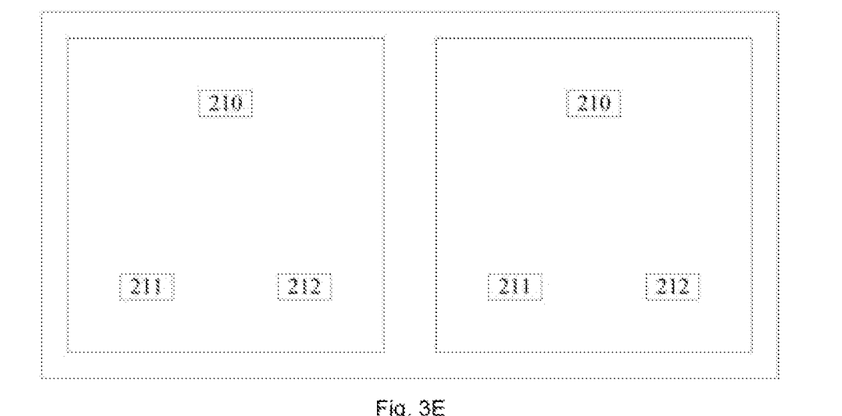
FIG. 3E shows a layout view of a light source according to an embodiment of the present disclosure.

Referring to FIG. 3E, in this embodiment, the backlight module 10 includes, for example, two groups of lighting units, and each group of the lighting units includes three light sources 200 (red laser diode 210, blue laser diode 211, and green laser diode 212) with different wavelengths. The light sources 200 in each group of the lighting units are arranged according to the array of the light sources 200 in FIG. 3B. The diffractive optical element 300 in each group of the lighting units shapes and enlarges the light emitted by the light source 200 to ½ the size of the backlight module 10. The rectangular spots of the two groups of lighting units are superimposed to form a spot with a larger area, thereby expanding the illumination area of the backlight module 10. In other embodiments, the backlight module 10 may further include three or four groups of the lighting units, but it is not limited thereto. In this embodiment, the lighting unit includes three light sources 200 with different wavelengths. In other embodiments, the lighting unit may include two, four, or five light sources 200 with different wavelengths, but it is not limited thereto.

Figure 4:
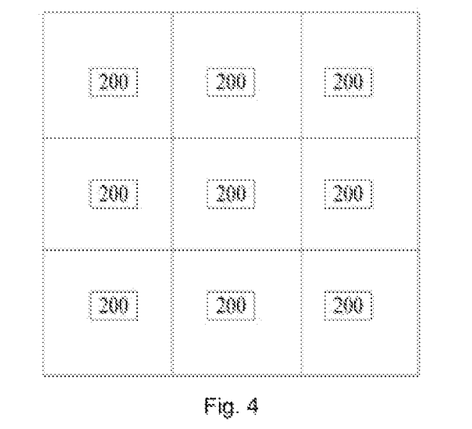
FIG. 4 shows a backlight module according to an embodiment of the present disclosure.

Referring to FIG. 4, this embodiment proposes a backlight module 10, which includes a backplane 100, at least one light source 200, at least one diffractive optical element 300, and an optical film 500.

Referring to FIG. 4, the backplane 100 includes a substrate 101 and a backplane frame 102, and the substrate 101 and the backplane frame 102 are fixed by screws or other methods. The substrate 101 is perpendicular to the backplane frame 102.

Referring to FIG. 4, the light source 200 is disposed on the substrate 101, and the light source 200 is connected with the circuit board on the substrate 101. The diffractive optical element 300 is arranged on the substrate 100, and the diffractive optical element 300 is aligned and arranged above the light source 200. The center lines of the diffractive optical element 300 and the light source 200 are on the same straight line. The diffractive optical element 300 collimates the light emitted by the light source 200 and shapes the collimated elliptical spot into a rectangular spot with a larger area. The optical film 500 is arranged above the backplane 100, and the optical film 500 is located above the diffractive optical element 300. The optical film 500 further improves the brightness of the backlight module and makes the brightness of the backlight module more uniform.

Figure 7A:
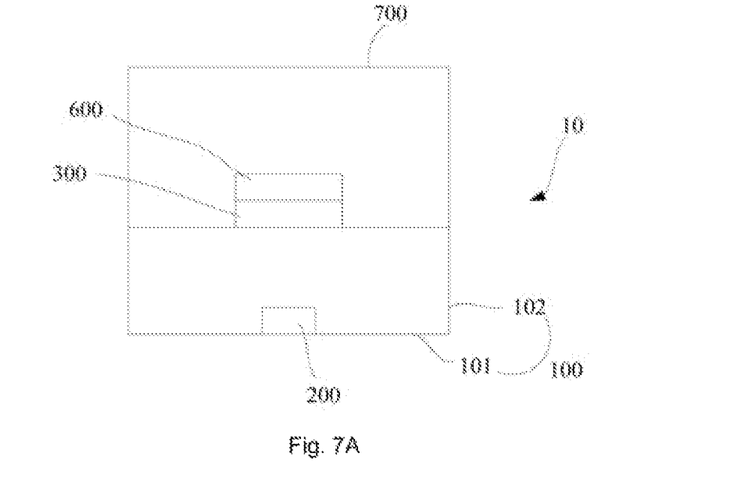
FIG. 7A shows a backlight module according to an embodiment of the present disclosure.

Referring to FIG. 7A, this embodiment proposes a backlight module 10, which includes a backplane 100, at least one light source 200, at least one diffractive optical element 300, and at least one grating element 600.

Figure 7B:
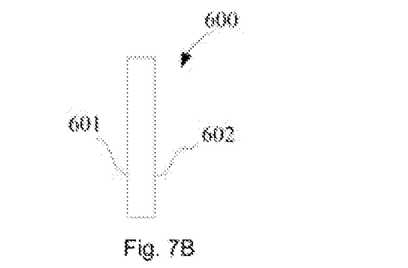
FIG. 7B shows a schematic view of the structure of a grating element in FIG. 7A.

Referring to FIGS. 7A-7B. In this embodiment, the backlight module 10 includes, for example, a grating element 600, and the grating element 600 is closely disposed on the diffractive optical element 300. The center lines of the light source 200, the diffractive optical element 300, and the grating element 600 are on the same straight line. The grating element 600 is used to enlarge the spot emitted by the diffractive optical element 300. The spot emitted by the light source 200 forms a rectangular spot with a larger area through the diffractive optical element 300. The rectangular spot is expanded by the grating element 600 to form a rectangular spot with a larger area on the output surface. In this embodiment, the grating element 600 includes a first phase distribution 601 and a second phase distribution 602. In this embodiment, after the rectangular spot passes through the first phase distribution 601 of the grating element, the first phase distribution 601 of the grating element can enlarge the size of the rectangular spot to $2 \times W_{DOE-max} \times L_{DOE-max}$, $W_{DOE-max} \times L_{DOE-max}$ represents the maximum spot size output by the diffractive optical element. After passing through the first phase distribution 601 of the grating element, the spot passes through the second phase distribution 602 of the grating element, the size of the spot output by the second phase distribution 602 of the grating element is $2 \times W_{DOE-max} \times 2 \times_{DOE-max}$. In this embodiment, the grating element 600 enlarges the spot formed by the diffractive optical element 300 by 4 times, which effectively forms a larger area under a shorter diffraction distance and reduces the volume of the backlight module. In this embodiment, the grating element 600 is, for example, a diffraction grating.

Figure 7C:
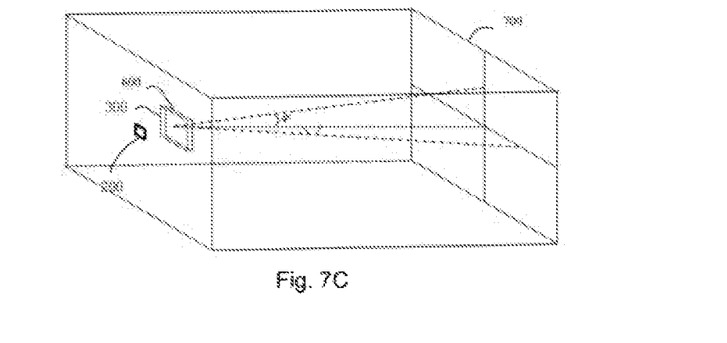
FIG. 7C shows a schematic view of a diffraction angle of the grating element.

Referring to FIG. 7C, in this embodiment, a diffraction angle of the first phase distribution of the grating element is as follows:

$$\gamma = \arctan \frac{W_{DOE\text{-}output}}{2 \times d_{DOE\text{-}BLU}},$$

$W_{DOE\text{-}output}$ represents a long axis of a rectangular spot output by a single diffractive optical element, and $d_{DOE\text{-}BLU}$ represents a distance from the diffractive optical element to an output surface light source (backlight unit (BLU)).

A diffraction angle of the second phase distribution 602 of the grating element is as follows:

$$\varphi = \arctan\frac{L_{DOE-output}}{2 \times d_{DOE-BLU}},$$

$L_{DOE-output}$ represents a short axis of a rectangular spot output by a single diffractive optical element, and $d_{DOE-BLU}$ represents a distance from the diffractive optical element to an output light source.

Referring to FIGS. 7A-7C, in this embodiment, the backlight module 10 includes a light source 200, a diffractive optical element 300, and a grating element 600. A spot emitted by the light source 200 passes through the diffractive optical element 300 to form a rectangular spot. The grating element 600 enlarges the rectangular spot to the size of the backlight module 10.

Figure 8A:
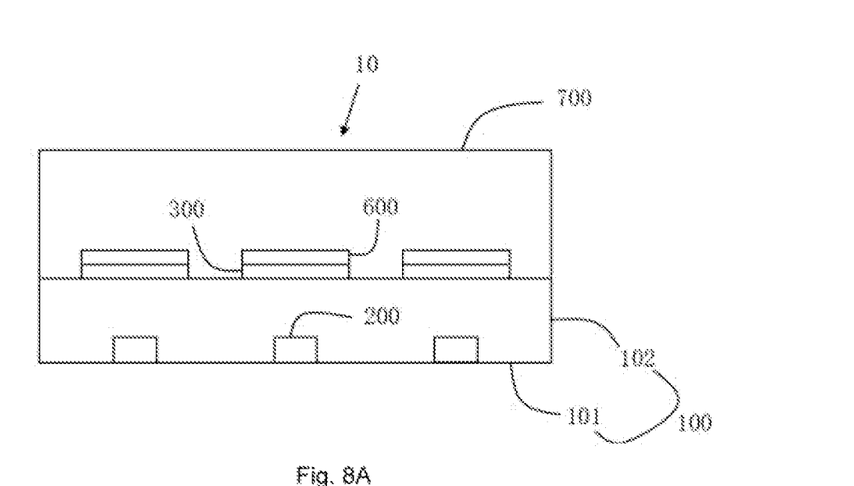
FIG. 8A shows a backlight module according to an embodiment of the present disclosure.
Figure 8B:
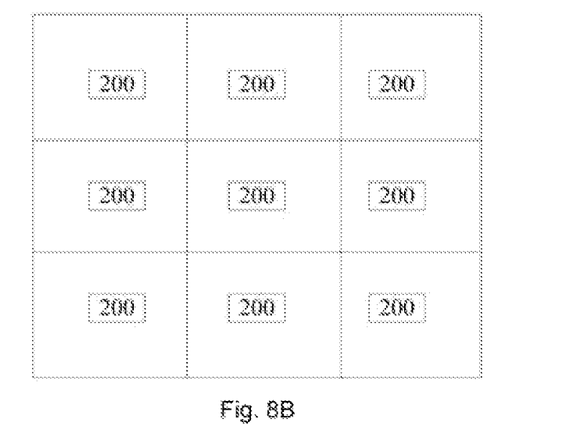
FIG. 8B shows a layout view of the light source in FIG. 8A.

Referring to FIG. 8A, this embodiment proposes a backlight module 10, which includes a backplane 100, at least one light source 200, at least one diffractive optical element 300, and at least one grating element 600.

Referring to FIGS. 2A-2B, in this embodiment, the backlight module 10 may include nine light sources 200, and the light sources 200 are disposed on the substrate 101. In this embodiment, the nine light sources 200 are fixed on the substrate 101 according to, for example, a 3×3 array. Two adjacent light sources 200 are spaced by an interval from each other. In other embodiments, the nine light sources 200 may be fixed on the substrate 101 in other ways. In this embodiment, the light source 200 is, for example, a monochromatic laser diode. In some embodiments, the backlight module 10 may include, for example, N×M light sources 200. The N×M light sources 200 may be arranged in an N×M array, where N and M are integers greater than 1, and N may be equal to or not equal to M.

Figure 8C:
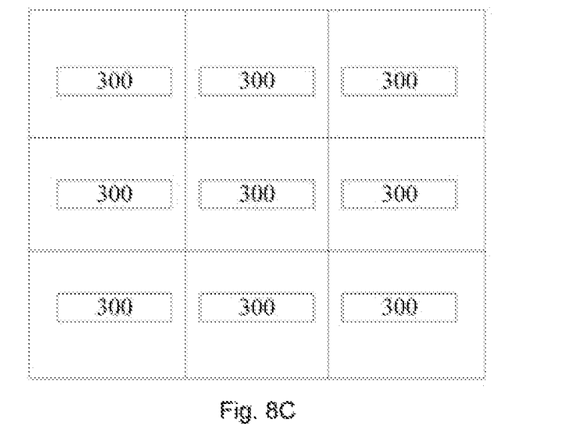
FIG. 8C shows a layout view of the diffractive optical element in FIG. 8A.
Figures 8D, 8E:
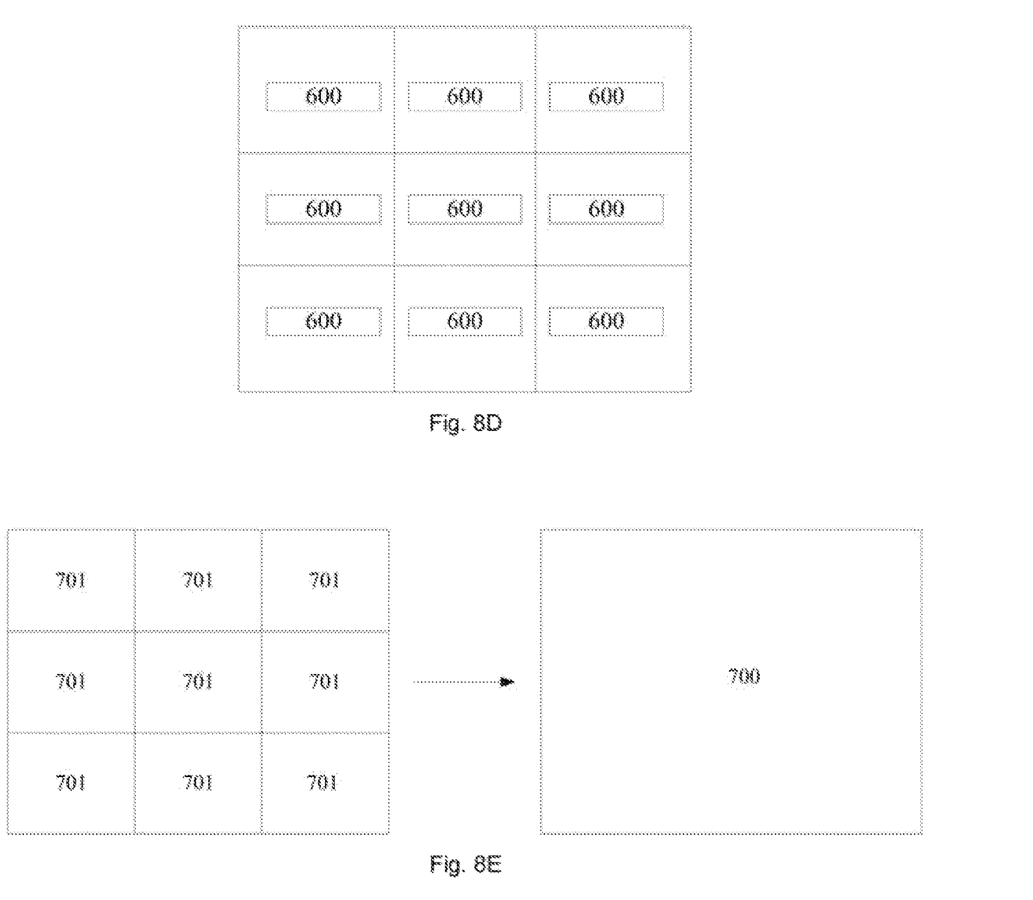
FIG. 8D shows a layout view of the grating element in FIG. 8A.
FIG. 8E shows a rectangular spot and a combined monochromatic surface light source formed by a single grating element.

Referring to FIGS. 8A and 8C, in this embodiment, the backlight module 10 includes, for example, nine diffractive optical elements 300. The diffractive optical elements 300 are aligned to and arranged above the light sources 200, and the center lines of the diffractive optical element 300 and the light source 200 are on the same straight line. The diffractive optical element 300 collimates the light (elliptical spot) emitted by the light source 200 and shapes the collimated elliptical spot into a rectangular spot. The rectangular spot formed by the diffractive optical element 300 has a size of a few centimeters, for example, 4-8 mm, and preferably 5-6 mm. In this embodiment, the wavelengths of the nine light sources 200 are the same, and the diffractive surfaces of the nine diffractive optical elements 300 are the same, that is, the phase distribution matrices of the nine diffractive optical elements 300 are the same.

Referring to FIGS. 8A-8E. In this embodiment, the backlight module 10 includes, for example, nine grating elements 600. The nine grating elements 600 are aligned to and disposed on the diffractive optical element 300. The center lines of the light source 200, the diffractive optical element 300, and the grating element 600 are on the same straight line. In this embodiment, the light source 200 is a laser diode. The spot emitted by a single laser diode passes through the diffractive optical element 300 to form a rectangular spot of a certain area (1/(4×9) of the size of the backlight module 10). In this embodiment, the backlight module 10 includes nine laser diodes, the diffractive optical element 300 forms nine rectangular spots, and the nine matrix spots have the same size. In this embodiment, the rectangular spot passes through the grating element 600 to form a rectangular spot 701 with a larger area. The size of a single rectangular spot 701 is equal to ⅑ of the size of the backlight module 10. The nine matrix spots 701 are mixed and superimposed to form a surface light source 700 with a larger area, and the size of the surface light source 700 is equal to the size of the backlight module 10.

Referring to FIGS. 6, and 8A-8F. In this embodiment, the backlight module 10 includes, for example, nine light sources 200, and the light sources 200 are laser diodes with the same wavelength (the wavelength is λ). The design method of the monochrome backlight module is described below.

Figure 8F:
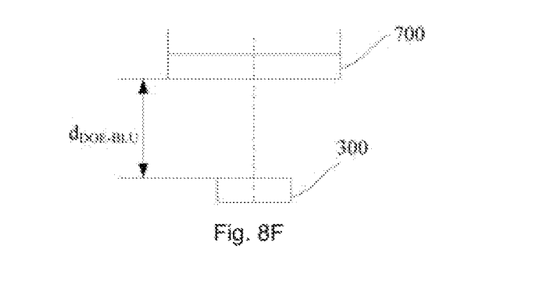
FIG. 8F shows a schematic view of a distance from the diffractive optical element to an output surface light source.

1. The surface light source 500 (illumination area) of the backlight module 10 is set as $W_{BLU} \times L_{BLU}$ (mm), the distance between the diffractive optical element 300 and the surface light source 500 is set as $d_{DOE-BLU}$ (mm).

2. The maximum light source area shaped and output by the diffractive optical element 300 is calculated and denoted as $W_{DOE-max} \times L_{DOE-max}$ (mm), in this embodiment, $$W_{DOE-max} = \frac{\lambda \times d_{DOE-BLU}}{Pixel_{DOE-x}} L_{DOE-max} = \frac{\lambda \times d_{DOE-BLU}}{Pixel_{DOE-y}},$$

$Pixel_{DOE-x}$ (µm) represents the minimum accuracy of the diffractive optical element in the horizontal direction, $Pixel_{DOE-y}$ (µm) represents the minimum accuracy of the diffractive optical element in the vertical direction.

3. The spot output by the diffractive optical element 300 passes through the first phase distribution 601 of the grating element 600, and the area of the spot output by the first phase distribution 601 is $2 \times W_{DOE-max} \times L_{DOE-max}$ (mm). The spot output by the first phase distribution 601 passes through the second phase distribution 602 of the grating element 600, and the area of the spot output by the second phase distribution 602 is $2 \times W_{DOE-max} \times 2 \times L_{DOE-max}$ (mm).

4. The number of needed laser diodes is calculated and denoted as $M_{LD} \times N_{LD}$, where $M_{LD}$ is an integer part of a number obtained by dividing $W_{BLU}$ by ($2 \times W_{DOE-max}$) plus 1, and $N_{LD}$ is an integer part of a number obtained by dividing $L_{BLU}$ by ($2 \times L_{DOE-max}$) plus 1.

5. The number of diffractive optical elements is calculated and denoted as $M_{DOE} \times N_{DOE}$, where $M_{DOE} = M_{LD}$, $N_{DOE} = N_{LD}$.

6. The area of the light source output by a single diffractive optical element is calculated and denoted as $W_{DOE-output} \times L_{DOE-output}$ (mm), where $$W_{DOE-output} = \frac{W_{BLU}}{M_{DOE}}, L_{DOE-output} = \frac{W_{BLU}}{N_{DOE}},$$

$W_{DOE-output}$ represents a long axis of the rectangular spot shaped and output by a single diffractive optical element, $L_{DOE-output}$ represents a short axis of the rectangular spot shaped and output by the single diffractive optical element.

7. The area of a single diffractive optical element 300 is calculated and denoted as $W_{DOE} \times L_{DOE}$, where $$W_{DOE} = 2\tan\frac{\alpha}{2} \times d_{LD-DOE}, L_{DOE} = 2\tan\frac{\beta}{2} \times d_{LD-DOE}.$$

$W_{DOE}$ represents a long axis of the diffractive optical element, $L_{DOE}$ represents a short axis of the diffractive optical element, α represents a horizontal divergence angle of the laser diode, β represents a vertical divergence angle of the laser diode, and $d_{LD\text{-}DOE}$ represents a distance from the laser diode to the diffractive optical element 300.

8. The wavelength λ of the laser diode is brought into the Getschberg-Sachston algorithm, and the phase distribution of the diffractive optical element is calculated according to the Getschberg-Sachston algorithm.

Referring to FIG. 7C, a diffraction angle of the first phase distribution 601 of the grating element 600 is:

$$\gamma = \arctan\frac{W_{DOE\text{-}output}}{2 \times d_{DOE\text{-}BLU}},$$

and a diffraction angle of the second phase distribution 602 of the grating element 600 is:

$$\varphi = \arctan\frac{L_{DOE\text{-}output}}{2 \times d_{DOE\text{-}BLU}}.$$

10. In this embodiment, the laser diode, the diffractive optical element, and the grating element are aligned.

Figure 9A:
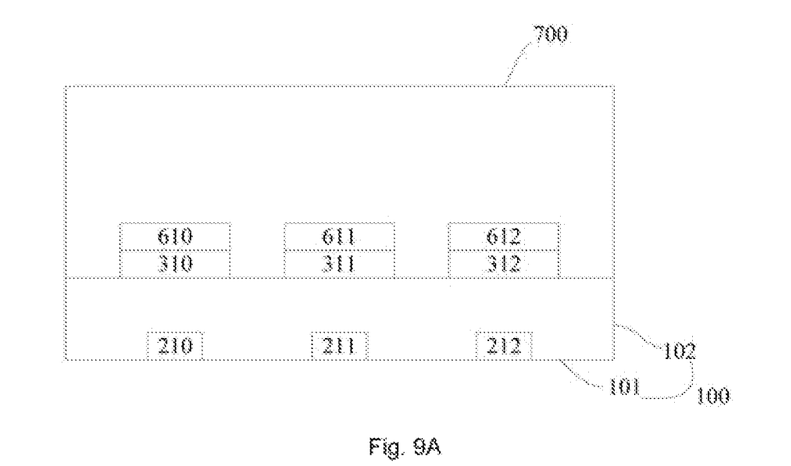
FIG. 9A shows a backlight module according to an embodiment of the present disclosure.

Referring to FIG. 9A, this embodiment proposes a backlight module 10, which includes a backplane 100, at least one light source, at least one diffractive optical element, and at least one grating element.

Figure 9B:
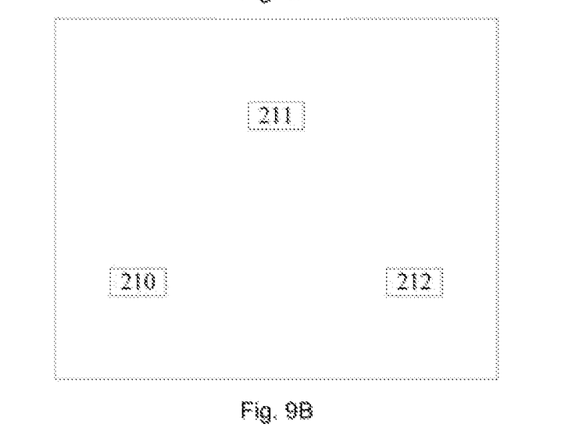
FIG. 9B shows a layout view of the light source in FIG. 9A.

Referring to FIGS. 9A-9B, in this embodiment, the backlight module 10 includes three light sources. The three light sources include, for example, a red laser diode 210, a blue laser diode 211, and a green laser diode 212. The red laser diode 210, the blue laser diode 211, and the green laser diode 212 may be mounted on the substrate 101 as shown in FIG. 9B. The red laser diode 210 is used to emit red light, and a wavelength of light emitted by the red laser diode 210 is 635 nanometers. The blue laser diode 211 is used to emit blue light, a wavelength of light emitted by the blue laser diode 211 is 470 nanometers. The green laser diode 212 is used to emit green light, and a wavelength of light emitted by the green laser diode 212 is 535 nanometers. In other embodiments, the light source may also include yellow or laser diodes with other colors. In other embodiments, the light source may be mounted on the substrate 101 in other ways.

Figure 9C:
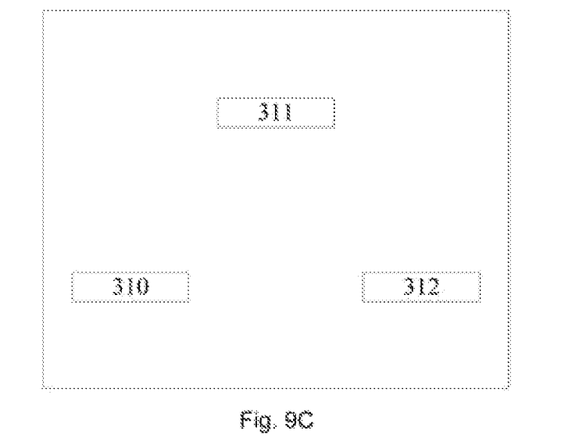
FIG. 9C shows a layout view of the diffractive optical element in FIG. 9A.
Figure 9D:
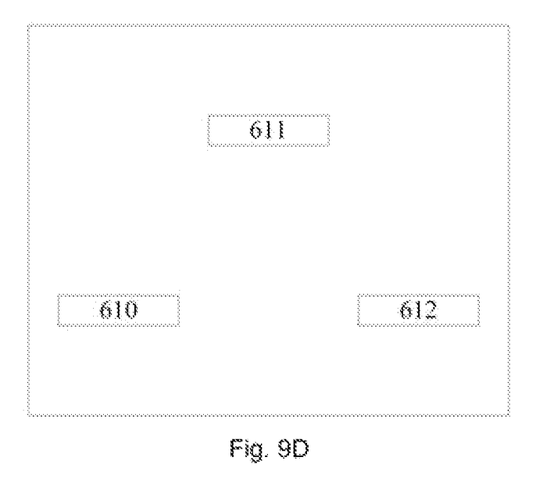
FIG. 9D shows a layout view of the grating element in FIG. 9A.

Referring to FIGS. 9A and 9C. In this embodiment, the diffractive optical element 300 includes, for example, three diffractive optical elements. The three diffractive optical elements are, for example, a diffractive optical element 310, a diffractive optical element 311, and a diffractive optical element 312. The diffractive optical element 310 is aligned and arranged above the red laser diode 210, the diffractive optical element 311 is aligned and arranged above the blue laser diode 211, and the diffractive optical element 312 is aligned and arranged above the green laser diode 212. Since the red laser diode 210, the blue laser diode 211, and the green laser diode 212 emit light with different wavelengths, the structures of the diffractive optical element 310, the diffractive optical element 311, and the diffractive optical element 312 are different. That is, the diffractive surface of the diffractive optical element 310, the diffractive surface of the diffractive optical element 311, and the diffractive surface of the diffractive optical element 312 are different. In other words, the phase distribution matrix of the diffractive optical element 310, the phase distribution matrix of the diffractive optical element 311, and the phase distribution matrix of the diffractive optical element 312 are different.

Figure 9E:
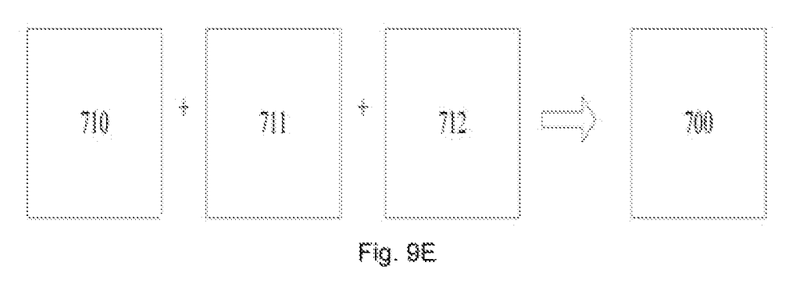
FIG. 9E shows a rectangular spot and a combined white surface light source formed by a single grating element.

Referring to FIGS. 9A-9E, in this embodiment, the backlight module 10 includes, for example, three grating elements, such as a grating element 610, a grating element 611, and a grating element 612. The grating element 610 is aligned and arranged closely above the diffractive optical element 310, the grating element 611 is aligned and arranged closely above the diffractive optical element 411, and the grating element 612 is aligned and arranged closely above the diffractive optical element 412. Take the red laser diode 210 as an example for illustration:

1. The light (elliptical spot) emitted by the red laser diode passes through the diffractive optical element 310 to form a red rectangular spot with a larger area (one-fourth of the size of the output surface light source 700).

2. The red rectangular spot passes through the grating element 610 to form a red rectangular spot 710 with a larger area. The size of the red rectangular spot 710 is equal to the size of the output surface light source 700 of the backlight module.

Similarly, the red rectangular spot 710, the blue rectangular spot 711, and the green rectangular spot 712 have the same size.

It should be noted that the number of the light sources, the diffractive optical elements, and the grating elements may be, for example, 4, 16 or more.

Figure 9F:
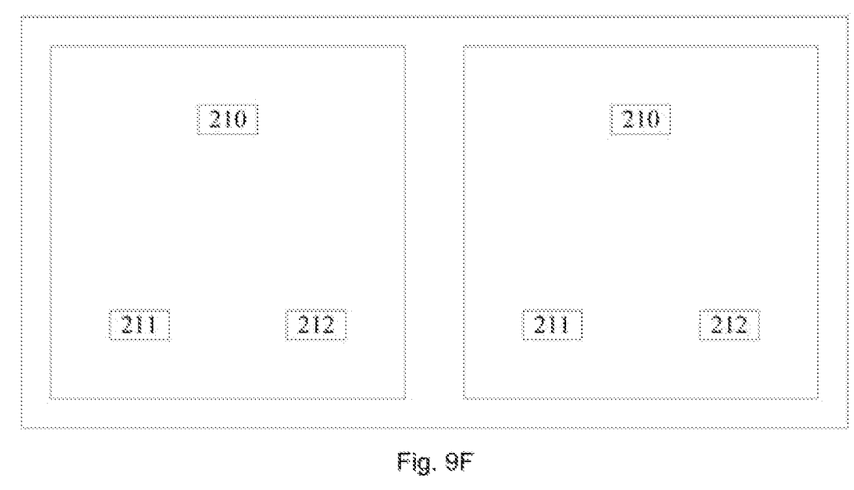
FIG. 9F shows a schematic view of a backlight module including two lighting units according to an embodiment of the present disclosure.

Referring to FIG. 9F, in this embodiment, the backlight module 10 includes, for example, two groups of lighting units, and each group of the lighting units includes three light sources 200 (the red laser diode 210, the blue laser diode 211, and the green laser diode 212) with different wavelengths. The light sources 200 in each group of the lighting units are arranged according to the array of the light sources 200 in FIG. 9B. The light (elliptical spot) emitted by the red laser diode 210 passes through the diffractive optical element 310 to form a red rectangular spot with a certain area (one-eighth of the size of the output surface light source 700). The rectangular spot emitted by the diffractive optical element 310 passes through the grating element 610, and an area of a rectangular spot emitted by the grating element 610 is half of the size of the output surface light source 700 of the backlight module. The rectangular spots of the two groups of lighting units are superimposed to form a spot with a larger area, thereby expanding the illumination area of the backlight module 10. In other embodiments, the backlight module 10 may further include three, four or more groups of the lighting units, but it is not limited thereto. In this embodiment, the lighting unit includes three laser diodes with different wavelengths. In other embodiments, the lighting unit may include two, four, or five laser diodes with different wavelengths, but it is not limited thereto.

Figure 10:
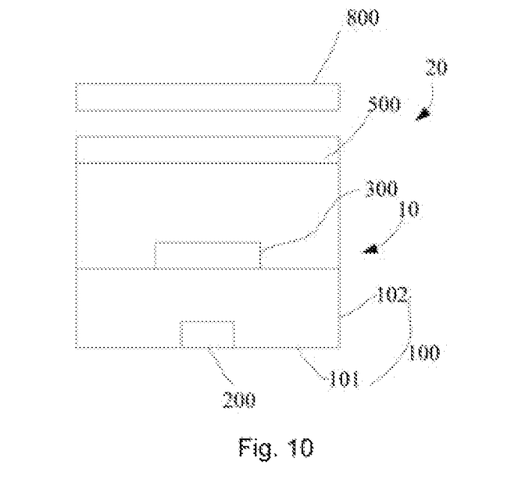
FIG. 10 shows an LCD according to an embodiment of the present disclosure.

Referring to FIG. 10, this embodiment further provides an LCD 20. The LCD 20 includes a liquid crystal panel 800 and a backlight module 10. The liquid crystal panel 800 is opposite to the backlight module 10 and disposed on the backlight module 10. The backlight module 10 provides a display light source to the liquid crystal panel 800, so that the liquid crystal panel 800 displays images.

Referring to FIG. 10, the backlight module 10 includes a backplane 100, a light source 200, a diffractive optical element 300, and an optical film 500. The light source 200 is located on the backplane 100, the diffractive optical element 300 is located above the light source 200, and the optical film 500 is located above the diffractive optical element 300. The center lines of the light source 200 and the diffractive optical element 300 are located on the same straight line. The diffractive optical element 300 collimates the light emitted by the light source 200 and shapes the collimated elliptical spot into a rectangular spot with a larger area. The light source 200 may be, for example, a laser diode.

Figure 11:
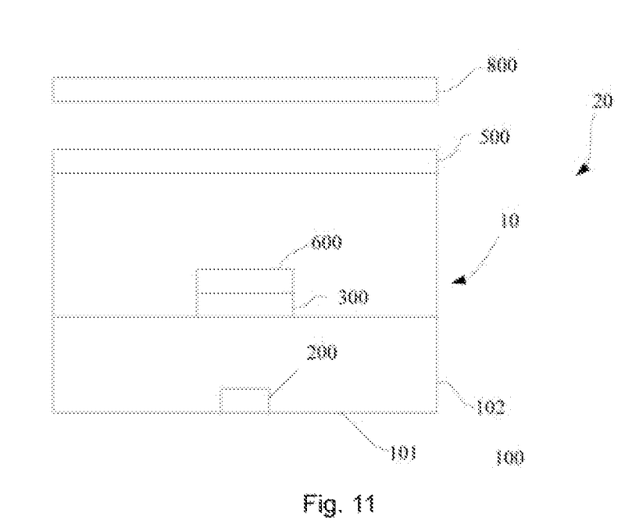
FIG. 11 shows the LCD according to an embodiment of the present disclosure.

Referring to FIG. 11, this embodiment further provides an LCD 20. The LCD 20 includes a liquid crystal panel 800 and a backlight module 10. The liquid crystal panel 800 is opposite to the backlight module 10 and disposed on the backlight module 10. The backlight module 10 provides a display light source to the liquid crystal panel 800, so that the liquid crystal panel 800 displays images.

Referring to FIG. 11, the backlight module 10 includes a backplane 100, a light source 200, a diffractive optical element 300, an optical film 500, and a grating element 600. The light source 200 is located on the backplane 100, the diffractive optical element 300 is located above the light source 200, the grating element 600 is located on the diffractive optical element 300, and the optical film 500 is located above the grating element 600. The center lines of the light source 200, the diffractive optical element 300, the optical film 500, and the grating element 600 are on the same straight line. The grating element 600 enlarges the spot emitted by the diffractive optical element 300. The light source 200 is, for example, a laser diode. The LCD in this embodiment can be applied to electronic devices, for example, the LCD can be applied to computers, mobile phones, televisions, or other electronic devices.

Referring to FIGS. 10-11. The LCD 10 in FIG. 11 includes a grating element 600. Therefore, the spot formed by the backlight module 10 in FIG. 11 is larger than the spot formed by the backlight module in FIG. 10. Therefore, when the light sources and the diffractive optical elements in FIG. 10 and FIG. 11 are the same, the area of the surface light source formed by the backlight module 10 in FIG. 11 is larger than the area of the surface light source formed by the backlight module 10 in FIG. 10. The area of the liquid crystal panel 800 in FIG. 11 is larger than the area of the liquid crystal panel 800 in FIG. 10.

In summary, the present disclosure proposes a backlight module, an LCD, and an electronic device. The light emitted by the light source is expanded and homogenized through a diffractive optical element, which can form a surface light source with uniform brightness and a large area in a small volume. The volume of the backlight module, the LCD, and the electronic device according to the present disclosure is small, and the color saturation is high.

The above description is only a preferred embodiment of the present disclosure and an explanation of the technical principles used. Those skilled in the art should understand that the scope involved in the present disclosure is not limited to the technical solution formed by the specific combination of the above technical features, but should also cover other technical solutions formed by any combination of the above technical features or their equivalents without departing from the concept of the present disclosure, such as technical solutions formed by replacing the above-mentioned features with the technical features disclosed (but not limited to) in the present disclosure with similar functions.

Except for the technical features described in the specification, the other technical features are known to those skilled in the art. In order to highlight the innovative features of the present disclosure, the rest of the technical features will not be repeated here.

I claim:

1. A backlight module, comprising:
a backplane;
at least one light source arranged on the backplane; and
at least one diffractive optical element arranged above the light source, and a central axis of the diffractive optical element and a central axis of the light source are on a same straight line; wherein the diffractive optical element is configured to collimate a light emitted by the light source, and shape a collimated elliptical spot into a rectangular spot with a larger area.

2. The backlight module according to claim 1, wherein the light source comprises a laser diode, the laser diode includes a wavelength or a plurality of different wavelengths, a size of a spot emitted by the laser diode is smaller than a size of the diffractive optical element.

3. The backlight module according to claim 1, wherein the diffractive optical element comprises a diffractive surface, a phase distribution matrix of the diffractive surface includes a first phase distribution matrix and a second phase distribution matrix, and the first phase distribution matrix and the second phase distribution matrix are superimposed to form the phase distribution matrix of the diffractive optical element.

4. The backlight module according to claim 3, wherein the first phase distribution matrix of the diffractive surface of the diffractive optical element is configured to collimate a light emitted by a laser diode.

5. The backlight module according to claim 3, wherein when the backlight module includes a laser diode with a single wavelength, the second phase distribution matrix shapes and enlarges a light emitted by the laser diode to a size of the backlight module.

6. The backlight module according to claim 2, wherein when the backlight module comprises M×N laser diodes with a same wavelength, phase distribution matrices of a diffractive surface of the diffractive optical element are the same, a single diffractive optical element shapes and enlarges a light emitted by a single laser diode to 1/(M×N) of the size of the backlight module.

7. The backlight module according to claim 1, wherein when the backlight module includes M×N groups of lighting units, the lighting units include a plurality of laser diodes with different wavelengths, phase distribution matrices of the diffractive optical elements of the laser diodes corresponding to different wavelengths are different, a single diffractive optical element in each group of the lighting units shapes and enlarges a light emitted by a single laser diode to 1/(M×N) of the size of the backlight module.

8. The backlight module according to claim 1, wherein the backlight module further comprises at least one grating element, the grating element is arranged above the diffractive optical element, and the grating element includes a first phase distribution and a second phase distribution.

9. The backlight module according to claim 8, wherein central axes of the light source, the diffractive optical element, and the grating element are on a same straight line, and the grating element is configured to enlarge a spot emitted by the diffractive optical element.

10. The backlight module according to claim 8, wherein numbers of the light source, the diffractive optical element, and the grating element are equal.

11. The backlight module according to claim 8, wherein after a rectangular spot passes through the first phase distribution of the grating element, the first phase distribution of the grating element enlarges a size of the rectangular spot to $2 \times W_{DOE-max} \times L_{DOE-max}$, and $W_{DOE-max} \times L_{DOE-max}$ represents a maximum spot size output by the diffractive optical element.

12. The backlight module according to claim 8, wherein after a spot output by the first phase distribution of the grating element passes through the second phase distribution of the grating element, a size of the spot output by the second phase distribution of the grating element is $2\times W_{DOE\text{-}max} \times 2\times L_{DOE\text{-}max}$.

13. The backlight module according to claim 8, wherein a diffraction angle of the first phase distribution of the grating element is as follows:

$$\gamma = \arctan\frac{W_{DOE\text{-}output}}{2\times d_{DOE\text{-}BLU}},$$

wherein $W_{DOE\text{-}output}$ represents a long axis of a rectangular spot output by a single diffractive optical element, $d_{DOE\text{-}BLU}$ represents a distance from the diffractive optical element to an output surface light source.

14. The backlight module according to claim 8, wherein a diffraction angle of the second phase distribution of the grating element is as follows:

$$\varphi = \arctan\frac{L_{DOE\text{-}output}}{2\times d_{DOE\text{-}BLU}},$$

wherein $L_{DOE\text{-}output}$ represents a short axis of a rectangular spot output by a single diffractive optical element.

15. The backlight module according to claim 8, wherein when the light source includes a laser diode, the grating element enlarges a rectangular spot emitted by the diffractive optical element to a size of the backlight module.

16. The backlight module according to claim 8, wherein when the backlight module includes M×N laser diodes with a same wavelength, a single diffractive optical element shapes and enlarges a light emitted by a single laser diode to 1/(4×M×N) of the size of the backlight module, and a single grating element enlarges a single rectangular spot to 1/(M×N) of the size of the backlight module.

17. The backlight module according to claim 8, wherein when the backlight module includes M×N groups of lighting units, a single diffractive optical element in each group of the lighting units shapes and enlarges a light emitted by a single laser diode to 1/(4×M×N) of the size of the backlight module, and a single grating element enlarges a single rectangular spot to 1/(M×N) of the size of the backlight module.

* * * * *